US006409308B1

(12) United States Patent
Maher et al.

(10) Patent No.: US 6,409,308 B1
(45) Date of Patent: Jun. 25, 2002

(54) METHOD OF FORMING AN INKJET PRINTHEAD NOZZLE STRUCTURE

(75) Inventors: Colin Geoffrey Maher; Kent Lee Ubellacker, both of Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/443,217

(22) Filed: Nov. 19, 1999

(51) Int. Cl.[7] .......................... B41J 2/14; B29C 35/08; G01D 15/00; G11B 5/127

(52) U.S. Cl. .......................... 347/47; 264/400; 216/27

(58) Field of Search .......................... 347/47, 20, 40; 216/27, 12, 48, 51, 52; 264/400; 219/121.68, 121.7, 121.71; 239/601

(56) References Cited

U.S. PATENT DOCUMENTS

| | | | | |
|---|---|---|---|---|
| 4,378,564 A | * | 3/1983 | Cross et al. | 347/54 |
| 4,558,333 A | | 12/1985 | Sugitani et al. | 347/65 |
| 5,305,018 A | | 4/1994 | Schantz et al. | 347/47 |
| 5,389,954 A | | 2/1995 | Inaba et al. | 347/258 |
| 5,417,897 A | | 5/1995 | Asakawa et al. | 264/400 |
| 5,455,998 A | | 10/1995 | Miyazono et al. | 29/611 |
| 5,703,631 A | | 12/1997 | Hayes et al. | 347/47 |
| 5,736,999 A | | 4/1998 | Aoki | 347/47 |
| 5,786,832 A | | 7/1998 | Yamanaka et al. | 347/45 |
| 5,811,019 A | | 9/1998 | Nakayama et al. | 216/27 |
| 5,855,713 A | | 1/1999 | Harvey | 156/153 |

* cited by examiner

*Primary Examiner*—N. Le
*Assistant Examiner*—Shih-Wen Hsieh
(74) *Attorney, Agent, or Firm*—Robert L. Showalter

(57) ABSTRACT

A method of forming one or more nozzles in a substrate used, for example, as a nozzle plate in an inkjet printhead of a thermal inkjet printer, using laser ablation, An opaque mask is interposed between a source of a laser beam and the substrate and includes one or more transparent, ring-shaped orifices therethrough arranged in a closely-spaced matrix. The beam is emitted from the laser source towards the mask such that the opaque portions of the mask block the beam from passing through the mask except for through the ring-shaped orifices. The beam is thereby separated into one or more ring-shaped beam portions, each of which penetrates the substrate at approximately the same and substantially constant intensity to ablate one or more ring-shaped openings in the substrate arranged on the substrate as a closely-spaced matrix. Ring-spaced openings each defines a center plug portion, which is removed from the substrate, for example, by vacuum or adhesive.

18 Claims, 4 Drawing Sheets

METHOD OF FORMING AN INKJET PRINTHEAD NOZZLE STRUCTURE

BACKGROUND OF THE INVENTION

1. Technical Field of the Invention

The present invention relates to methods of forming one or more nozzles in a substrate used, for example, as a nozzle plate in a printhead of a thermal inkjet printer. More particularly, the present invention relates to a method of forming one or more nozzles in a substrate, wherein the nozzles are formed by laser ablation.

2. Description of the Related Art

Thermal inkjet printers operate by ejecting ink from a printhead onto a printable medium, such as paper. The printhead includes a plurality of nozzles formed in a substrate and arranged as a matrix such that, by ejecting ink only from preselected nozzles defining a predetermined pattern, the ejected ink will form an image, such as a letter, on the printable medium. The printhead further includes a heater chip provided with a plurality of resistive heating elements, one heating element positioned below each nozzle. Each nozzle is in fluid communication with an ink chamber formed in the printhead and sized to receive a small volume of ink therein. Upon heating the ink contained within the chamber to a temperature sufficient to vaporize the ink, an ink droplet is ejected from the chamber, through the nozzle, and onto the printable medium. Selectively heating only preselected heating elements, then, controls the pattern of ink being ejected from the printhead, and consequently, defines the image being formed on the printable medium.

As can be appreciated by one of reasonable skill in the art, text and other images are printed onto the printable medium by ejecting ink through predetermined combinations of preselected nozzles, which form the image onto the printable medium as a series of closely-spaced ink dots. It follows, then, that the closer the spacing between adjacent nozzles (and, hence, the closer the spacing between adjacent printed ink dots), the clearer and more continuous the appearance of the printed image. It is therefore desirable to provide a method of forming one or more nozzles in a substrate used, for example, as a nozzle plate in an inkjet printhead, wherein adjacent nozzles are spaced sufficiently close to one another to provide a clear and substantially continuous appearance to an image printed thereby.

However, it has been observed that, if the nozzles are spaced closely together and only a limited amount of material remains surrounding the nozzles, the remaining material may become damaged, for example, during a wash process typically used in thermal inkjet printers between print cycles. It is therefore desirable to provide a method of forming one or more closely-spaced nozzles in a substrate used, for example, as a nozzle plate in an inkjet printhead, wherein adjacent nozzles are formed such that sufficient material remains to support the nozzles.

One such method of forming a nozzle in a substrate used, for example, as a nozzle plate for an inkjet printhead, is known to those of reasonable skill in the art as laser ablation, whereby the substrate is positioned in the path of a laser beam emitted from a laser source. The laser beam penetrates the substrate and ablates material therefrom to form the nozzle thereby. It is to impart a predefined shape in the beam by interposing an opaque mask between the laser source and the substrate, wherein the opaque mask includes a transparent orifice having the predefined shape, through which the laser beam passes. The opaque portions of the mask block the remaining, peripheral, portions of the laser beam surrounding the orifice from penetrating the substrate and from ablating additional material therefrom. Accordingly, a nozzle is ablated in the substrate having a shape substantially similar to the shape of the orifice. It is therefore desirable to provide a method of forming one or more nozzles in a substrate used, for example, as a nozzle plate in an inkjet printhead, using laser ablation, wherein the cross-section of a laser used to ablate material from the substrate is defined by a mask interposed between a source of the laser and the substrate.

It is known in the art to use an opaque mask to simultaneously form more than one nozzle in a substrate useful, for example, as a nozzle plate of an inkjet printhead. For example, one or more orifices may be provided in the mask arranged in a preselected pattern, such as in the form of a matrix, and interposed between the source of the beam and the substrate. Projecting a beam onto the mask, then, separates the beam into a plurality of parallel, spaced-apart beam portions, each of which penetrates the substrate to form one nozzle. A matrix of nozzles are thus formed in the substrate. It is therefore desirable to provide a method of forming a plurality of nozzles in a substrate used, for example, as a nozzle plate in an inkjet printhead, using laser ablation, wherein an opaque mask is interposed between a source of the laser and the substrate, and wherein the mask includes a plurality of orifices arranged in a predetermined pattern to separate the laser into a plurality of beam portions.

It is also known in the art to impart a predefined tapered shape in the nozzle. For example, U.S. Pat. No. 5,417,897 to Asakawa, et al., teaches a method of forming tapered inkjet nozzles in a printhead layer, wherein a laser is passed through an orifice in an opaque mask, and wherein the periphery of the orifice includes partially opaque portions to reduce the intensity of the laser passing through the orifice near its periphery. The center of the laser penetrates the substrate at full intensity, completely ablating material from the substrate. The periphery of the laser, however, strikes the substrate at a reduced intensity insufficient to fully penetrate the substrate. Because the opacity of the orifice increases towards its periphery, the intensity of the laser passing therethrough decreases towards Its periphery and the depth to which the laser penetrates the substrate is reduced, thereby forming a nozzle with an inward taper such that the diameter of the nozzle where the laser enters the substrate is larger than the diameter of the nozzle where the laser exits the substrate. However, spacing of one or more nozzles arranged, for example, as a matrix on the substrate, is limited by the greater diameter of the nozzle formed on the surface of the substrate where the laser entered it, thereby limiting the minimum distance between which adjacent ink dots may be printed on the printable medium. It is therefore desirable to provide a method of forming one or more nozzles in a substrate used, for example, as a nozzle plate in an inkjet printhead, wherein spacing of adjacent nozzles Is optimized.

SUMMARY OF THE INVENTION

The present invention is for a method of forming one or more nozzles in a substrate used, for example, as a nozzle plate in an inkjet printhead of a thermal inkjet printer, using laser ablation. A partially-opaque mask is interposed between a source of a laser beam and the substrate and includes one or more ring-shaped orifices in an opaque coating layer thereof arranged in a closely-spaced matrix. The beam is emitted from the laser source towards the mask such that opaque portions of the opaque layer block the beam from passing through the mask except for through the ring-shaped orifices. The beam is thereby separated into one or more ring-shaped beam portions, each of which penetrates the substrate at approximately the same and substantially constant intensity to ablate one or more ring-shaped openings in the substrate arranged on the substrate as a closely-spaced matrix. Ring-spaced openings each defines a center plug portion, which is removed from the substrate, for example, by vacuum or adhesive.

According to one aspect of the present invention, a method of forming one or more nozzles in a polymeric material substrate is provided, comprising the steps of: providing a laser source adapted to emit a beam of laser energy along a path directed substantially towards the substrate; providing a mask having one or more openings surrounding one or more opaque mask portions; positioning the mask between the laser source and the substrate such that the one or more openings of the mask intersect the path of the beam; emitting the beam substantially along the path towards the substrate; blocking one or more first portions of the beam with the mask such that one or more second portions of the beam pass through the one or more openings of the mask, the one or more second portions of the beam contacting one or more regions of the substrate such that one or more openings surrounding one or more polymeric material plug portions are formed in the substrate; and, removing the one or more plug portions from the substrate to form nozzles in the substrate.

According to another aspect of the present invention, a system for forming one or more openings surrounding one or more plug portions in a polymeric material substrate is provided, comprising: a laser source adapted to emit a beam of laser energy along a path directed substantially towards the substrate; and, a mask having one or more openings surrounding one or more opaque mask portions, the mask being positioned between the laser source and the substrate, and wherein one or more portions of the beam pass through the one or more openings of the mask to contact one or more regions of the substrate such that the one or more openings surrounding the one or more polymeric material plug portions are formed in the substrate.

According to yet another aspect of the present invention, a method of forming one or more nozzles in a polymeric material substrate is provided, comprising the steps of: providing a polymeric material substrate; laser ablating the substrate to form one or more openings surrounding one or more polymeric material plug portions in the substrate; and, removing the one or more plug portions such that one or more nozzles are provided in the substrate.

It is an object of the present invention to provide a method of forming one or more nozzles in a substrate used, for example, as a nozzle plate in an inkjet printhead, wherein adjacent nozzles are spaced sufficiently close to one another to provide a clear and substantially continuous appearance to an image printed thereby.

It is another object of the present invention to provide a method of forming one or more nozzles in a substrate used, for example, as a nozzle plate in an inkjet printhead, wherein adjacent nozzles are spaced sufficiently far from one another to support the nozzles.

It is still another object of the invention to provide a method of forming one or more nozzles in a substrate used, for example, as a nozzle plate in an inkjet printhead, using laser ablation, wherein the cross-section of a laser used to ablate material from the substrate is defined by a mask interposed between a source of the laser and the substrate.

It is yet another object of the present invention to provide a method of forming a plurality of nozzles in a substrate used, for example, as a nozzle plate in an inkjet printhead, using laser ablation, wherein an opaque mask is interposed between a source of the laser and the substrate, and wherein the mask includes a plurality of orifices arranged in a predetermined pattern to separate the laser into a plurality of beam portions.

It is still another object of the present invention to provide a method of forming one or more nozzles in a substrate used, for example, as a nozzle plate in an inkjet printhead, wherein spacing of adjacent nozzles is optimized.

These and additional objects, features and advantages of the present invention will become apparent to those reasonably skilled in the art from the description which follows, and may be realized by means of the instrumentalities and combinations particularly pointed out In the claims appended hereto.

BRIEF DESCRIPTION OF THE DRAWINGS

A better understanding of the present invention will be had upon reference to the following description in conjunction with the accompanying drawings in which like reference numerals represent like parts, and wherein.

DETAILED DESCRIPTION OF THE PREFERRED EMBODIMENTS

Figure 1:
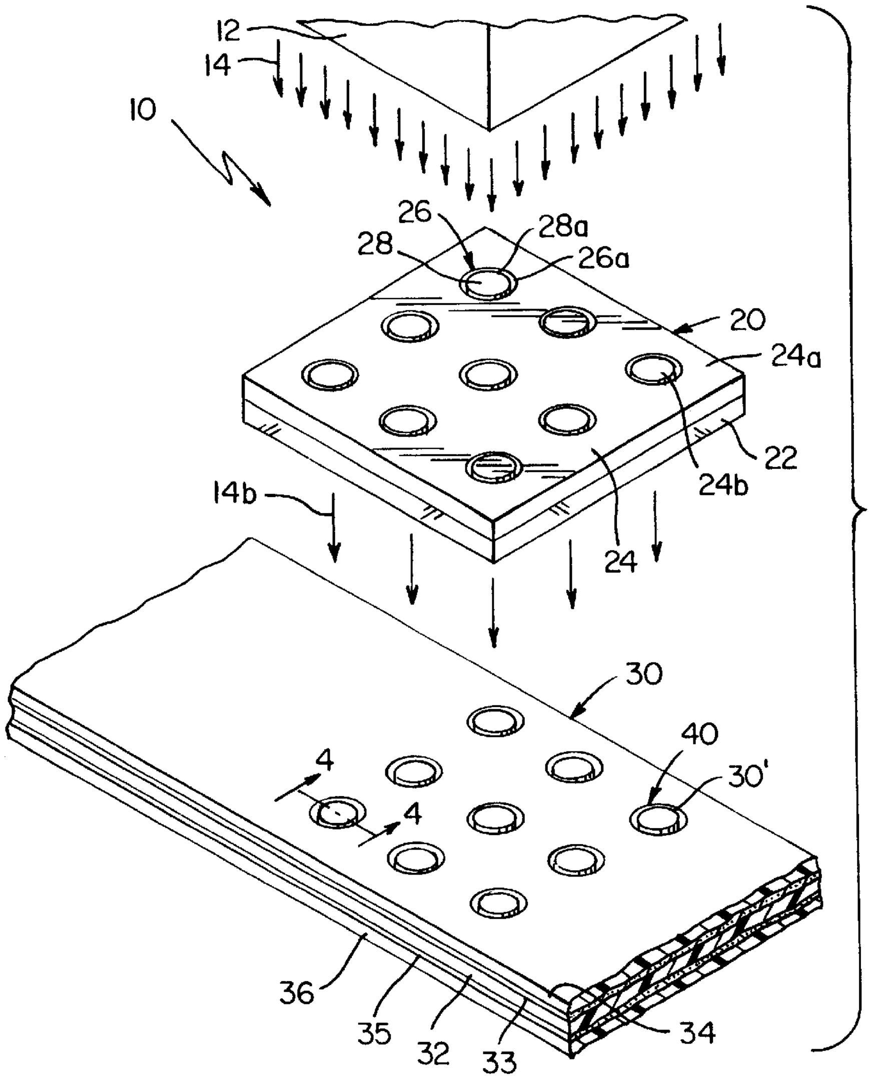
FIG. 1 is a perspective view of a system for forming one or more nozzles in a substrate according to a preferred embodiment of the present invention.

With reference to FIG. 1, a system 10 for forming one or more nozzles in a substrate 30 according to a preferred embodiment of the present invention includes a laser source 12, such as an excimer laser-emitting device with beam-shaping optics, adapted to direct a beam 14 of radiation onto a partially-opaque mask 20. Laser source 12 may be any suitable device adapted to emit a beam of radiation of sufficient composition and intensity to irradiate the substrate 30 and to ablate material therefrom. Accordingly, substrate 30 is constructed from any suitable material or materials which may have portions thereof ablated therefrom by a beam of radiation such as beam 14 emitted from laser source 12. For example, substrate 30 preferably includes a layer 32 of a polymeric material, such as, polyimide, polyester, fluorocarbon polymers or polycarbonate, which is preferably about 15 to about 200 microns thick, and more preferably, about 25 to about 50 microns thick. In the illustrated embodiment, the layer 32 comprises a layer of polyimide material, which is commercially available from Ube (of Japan) and from E.I. duPont de Nemours and Co. under the trademarks of UPILEX and KAPTON, respectively. As will be discussed in further detail below, portions of the layer 32 are ablated from the substrate 30 when beam 14 (or when a portion 16 of beam 14) contacts the substrate 30.

Figure 2:
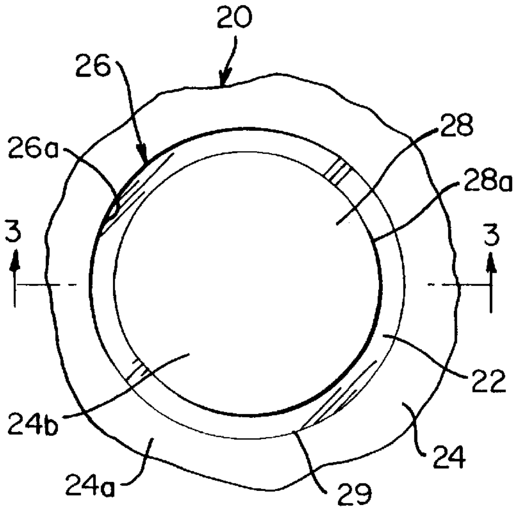
FIG. 2 is a top view of a portion of a mask used in the system of FIG. 1, showing a ring-shaped orifice.

Mask 20 includes a clear layer 22, such as, for example, of transparent quartz, having a thin layer or coating 24 of opaque material formed thereover (FIG. 1). Opaque coating 24 is formed from a material, such as, for example, chrome, an ultraviolet-enhanced coating, or the like, which is suitable to block or reflect laser light, and includes a first portion 24*a* which defines a plurality of spaced-apart openings 26 arranged in the form of a closely-spaced matrix. With additional reference to FIG. 2, the opaque coating 24 further includes a second portion 24*b* comprising a plurality of circular opaque disks 28 (also referred to herein as opaque mask portions). The opaque disks are positioned concentrically within each of the plurality of openings 26. Each disk 28 includes an outer periphery 28*a* spaced from an inner diameter 26*a* of a corresponding opening 26, thereby defining a ring-shaped orifice 29 therebetween devoid of any opaque coating material whatsoever. Although openings 26 are shown in the Figures to be in widely-spaced relation to one another, this is for the purpose of clarity only. It Is preferable for a center axis of each opening 26 to be spaced from the respective center axes of the openings 26 adjacent to it by a distance of not more than about 0.0423 mm. Openings 26 and disks 28 are preferably circular in shape, although they alternatively may be elliptical, rectangular or any other desired shape.

Figure 3:
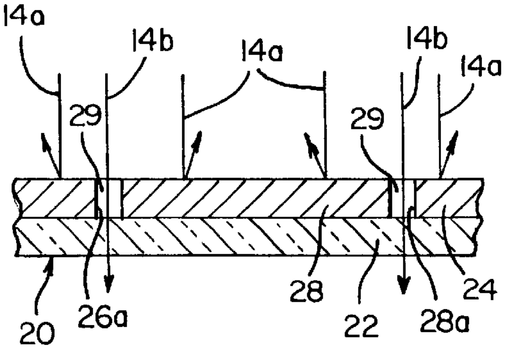
FIG. 3 is a sectional view of the portion of the mask of FIG. 2, showing the mask in cross-section along section line 3—3 of FIG. 2.

With reference now to FIG. 3, opaque layer 24 blocks or reflects portions 14*a* of beam 14 not directed towards the ring-shaped orifices 29, and permits portions 14*b* of beam 14 directed towards the ring-shaped orifices 29 to pass through the opaque layer 24 and through the clear layer 22 towards the substrate 30 (FIG. 1). Of course, beam portions 14*b* are thereby imparted with a ring-shaped cross-section. With reference again to FIG. 1, ring-shaped beam portions 14*b* contact substrate 30 and ablate one or more ring-shaped openings 40 therein in spaced relation in the form of a closely-spaced matrix.

Figure 4:
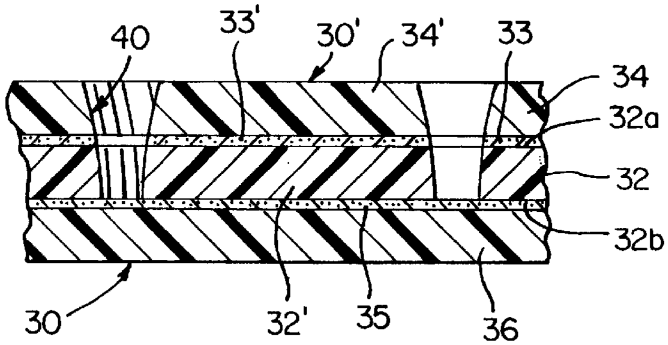
FIG. 4 is a sectional view of the substrate of FIG. 1, showing the substrate in cross-section along section line 4—4 of FIG. 1.

Referring now also to FIG. 4, polymeric layer 32 of substrate 30 is coated on a heater chip side surface 32*a* thereof with a first coating of adhesive 33, such as, phenolic butyral, which is used to affix the polymeric layer 32 to a heater chip of a thermal inkjet printer. To protect first adhesive layer 33 during formation of the openings 40 therein, a sacrificial layer 34 coats an exposed surface of the first adhesive layer 33 and is formed of a material, such as, polyvinyl alcohol, which is adapted to be washed away from the first adhesive layer 33 in a subsequent process step following formation of openings 40. A paperside surface 32*b* of polymeric layer 32 is coated with a second coating 35 of adhesive formed from a material such as, acrylic, which removably adhesively secures a backing sheet 36 to the paperside surface 32*b* of the polymeric layer 32. Backing layer 36 is preferably formed of a material such as plasticized polyvinylchloride.

Figure 5:
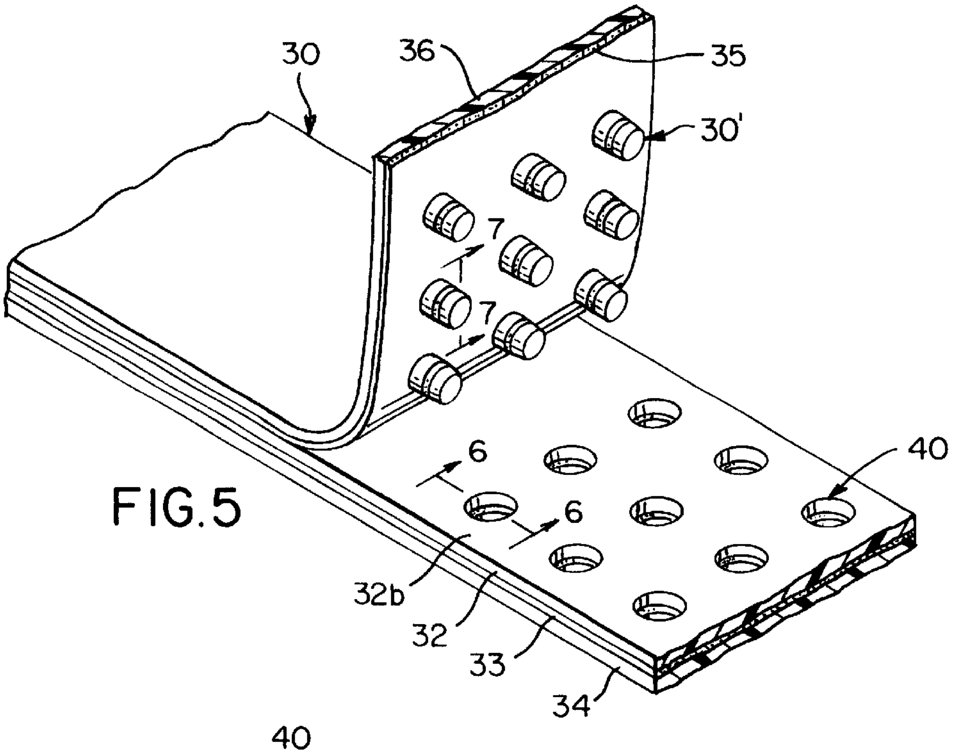
FIG. 5 is a perspective view of an underside surface of the substrate of FIG. 1, showing a backing layer and a second adhesive layer thereof being partially removed therefrom.
Figure 6:
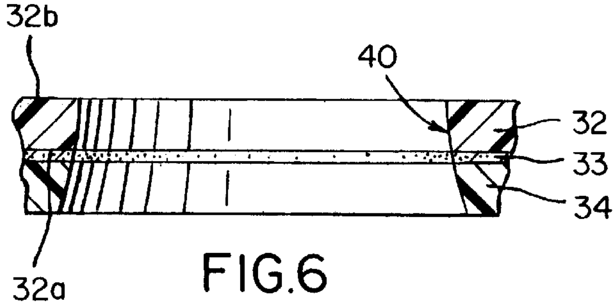
FIG. 6 is a sectional view of a polymeric layer of the substrate of FIG. 5, shown affixed to a sacrificial layer by a first adhesive layer and shown along section line 6—6 of FIG. 5.
Figure 7:
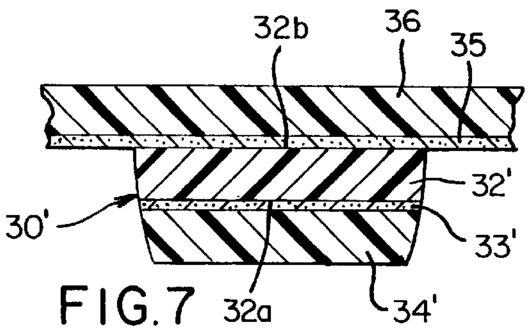
FIG. 7 is a sectional view of the substrate of FIG. 5, shown along section line 7—7 of FIG. 5.

The strength of beam 14 is preselected to be a sufficient intensity and duration such that the ring-shaped cross-sectional beam portions 14*b* penetrate only sacrificial layer 34, first adhesive layer 33 and polymeric layer 32, but do not penetrate either second adhesive layer 35 or backing layer 36. With combined reference to FIGS. 5–7, peeling backing layer 36 (and second adhesive layer 35, which remains adhesively affixed to an inside surface of backing layer 36) away from the paperside surface 32*b* of the polymeric layer 32, then, exposes paperside surface 32*b* of the polymeric layer 32 and removes a plug portion 30' of substrate 30 from within each of the plurality of openings 40. Because ring-shaped cross-sectional beam portions 14*b* penetrate each of sacrificial layer 34, first adhesive layer 33 and polymeric layer 32, each substrate plug portion 30' includes a first disk-shaped plug portion 34' of sacrificial layer 34, a second disk-shaped plug portion 33' of first adhesive layer 33 and a third disk-shaped plug portion 33' of polymeric layer 32 adhesively affixed to the backing layer 36 by the second adhesive layer 35.

Figure 8:
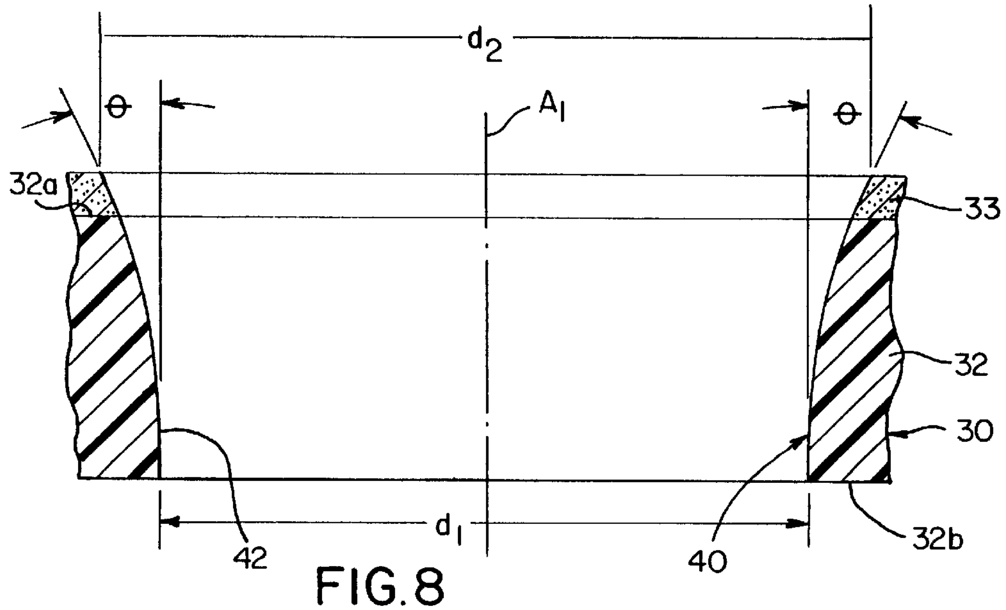
FIG. 8 is a sectional view of the polymeric layer of the substrate of FIG. 5, shown after the sacrificial layer has n removed to expose the first adhesive layer.

With reference to FIG. 8, after sacrificial layer 34 (FIG. 6) has been washed away from first adhesive layer 33, heater chip side surface 32*a* of polymeric layer 32 is adhesively affixed to a heater chip by adhesive layer 33. Openings 40, having substrate plug portions 30' (FIG. 6) been removed therefrom, define nozzles 42 through the polymeric layer 32, through which ink is ejected. Although each nozzle 42 forms a slightly tapered angle "θ" relative to a center axis $A_1$ of its respective opening 40, when the nozzle 40 is formed with the mask 20 having opaque disks 28 formed concentrically within openings 26, angle "θ" is much smaller than when no such opaque disks 28 are provided within circular openings 26. More particularly, angle "θ" may either be constant from the heater chip side surface 32*a* of the polymeric layer 32 (where the laser portion 14*b* "enters" the polymeric layer 32) to the paper side surface 32*b* of the polymeric layer 32 (where the laser portion 14*b* "leaves" the polymeric layer 32) or may vary therebetween. For example, angle "θ" typically varies from about 7° to about 5.5° and is calculated by measuring a paperside nozzle diameter "$d_1$", measuring a printhead side nozzle diameter "$d_2$", and (where ink exits the printhead and is deposited onto a printable medium held in close proximity to the nozzle 42) is a preselected value, for example, from about 0.015 mm to about 0.030 mm, which is selected to obtain a predetermined print quality. The heater chip side nozzle diameter "$d_2$" is greater than paper side nozzle diameter "$d_1$" due to angle "θ"; however, because angle "θ" is smaller than or equal to about 7° throughout, printhead side nozzle diameter "$d_2$" is much smaller than if angle "θ" were greater than about 7°. Accordingly, nozzles 42 are adapted to be spaced sufficiently close to one another to provide a clear and substantially continuous appearance to images printed thereby, yet are spaced sufficiently far apart from one another such that sufficient substrate material is provided to support the nozzles 42. For example, one nozzle 42 formed using a method according to a preferred embodiment of the present invention includes a heater chip side diameter of about 0.039 mm, a paper side diameter of about 0.0265 mm, a polymeric layer thickness of about 0.0635 mm and a passageway angle "θ" between about 5° and about 7°. Center axes of adjacent nozzles 42 are spaced from one another by a distance of about 0.042 mm.

Figure 10:
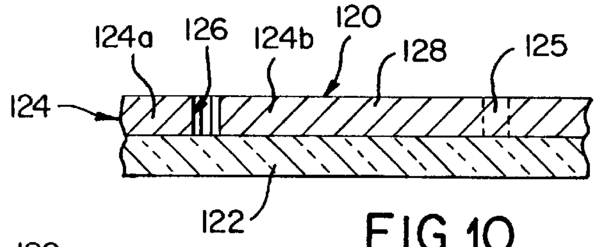
FIG. 10 is a sectional view of the portion of the mask of FIG. 9, showing the mask In cross-section along section line 10—10 of FIG. 9.
Figure 9:
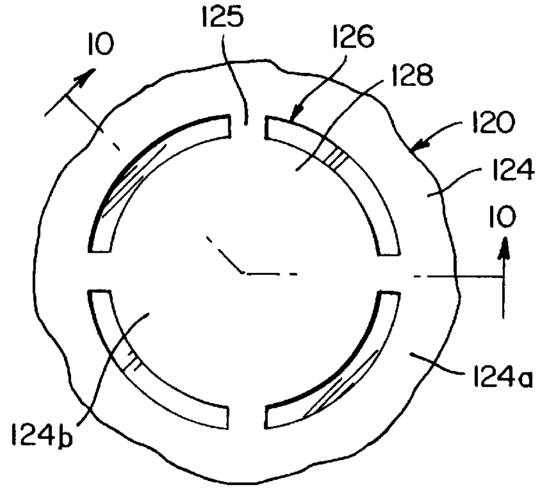
FIG. 9 is a top view of a portion of a mask used in a system according to an alternative embodiment of the present invention.
Figure 11:
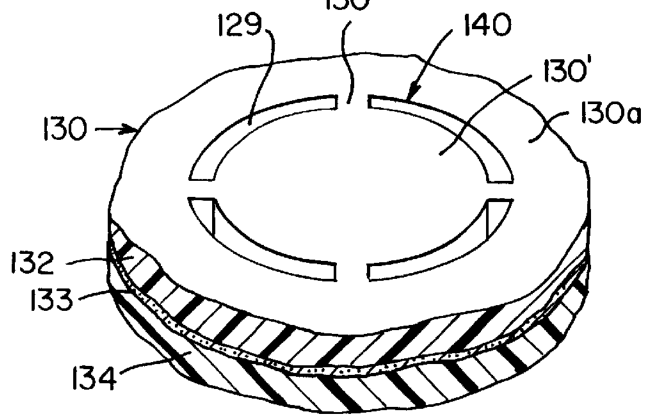
FIG. 11 is a perspective sectional view of one nozzle formed in a substrate using the mask of FIG. 9.

With combined reference to FIGS. 9–11, a system used to form one or more nozzles in a substrate 130 according to an alternative embodiment of the present invention includes a partially-opaque mask 120 having a clear layer 122 with a thin layer 124 of opaque material formed thereover. The opaque layer 124 includes a first portion 124*a* which defines a plurality of spaced-apart openings 126. A second portion 124*b* of the opaque layer 124 includes a plurality of circular opaque disks 128 formed concentrically within the plurality of spaced-apart openings 126. In the illustrated embodiment, a set of four openings 126 surrounds each opaque disk 128. The second portion 124*b* further includes a plurality of opaque bridge segments 125 which extend between the opaque disks 128 and the first portion 124. In the illustrated embodiment, four bridge segments 125 extend to each disk 128.

Interposing the mask 120 between the substrate 130 and a laser source 12 (FIG. 1) and in the path of a beam 14 (FIG. 1) emitted from the laser source 12, then, forms discontinuous frame-like openings 129 in the substrate 130 having one or more bridge segments 130" connecting a substrate plug portion 130' to a matrix 130*a* portion of the substrate 130 surrounding each opening 129. In one embodiment, frame-like openings 129 are annular, thereby defining a discontinuous ring-shaped opening. Because substrate plug portion 130' is held in position within each opening 129 by bridge segments 130", backing layer 36 (FIG. 4) and second adhesive layer 35 (FIG. 4) used in the preferred embodiment hereof to hold plug portions 30' within openings 29 are unnecessary. Accordingly, substrate 130 used with mask 120 of the present embodiment includes only polymeric layer 132, first adhesive layer 133 and sacrificial layer 134.

Plug portions 130' are removed from within openings 129 by any suitable means, for example, by applying a vacuum to the substrate 130, wherein the vacuum is supplied by a vacuum source provided following formation of the openings 129. However, vacuum alternatively may be applied to the substrate 130 immediately after the opening 129 has been ablated from the substrate 130, in which case, bridge segments 125 are not required, as plug portions 130' will be removed from within the openings 126 as soon as they are formed. Alternatively, a backing layer (FIG. 4) may be used to remove plug portions 130' from substrate 130 as with the preferred embodiment described above.

Figure 12:
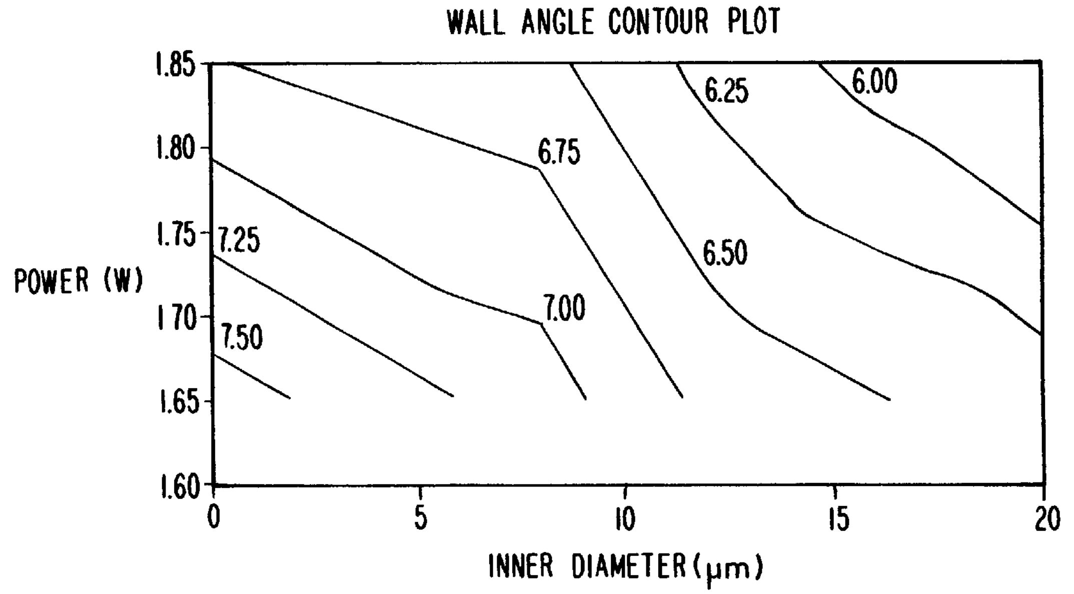
FIG. 12 is a graph of laser power versus mask opaque disk diameter for a range of preselected nozzle passageway wall angles; and, FIG. 13 is a graph of laser power versus mask opaque disk diameter for a range of exit diameter variations.

With reference to FIG. 12, one feature of the present invention Is shown to reduce the power or intensity required to be supplied to the laser beam in order to obtain a preselected nozzle passageway wall angle "θ" (FIG. 8), given a preselected mask opening 26 (FIG. 2) diameter. For example, for a given mask opening diameter of 0.042 mm, FIG. 12 shows that, to obtain a nozzle passageway wall angle "θ" of 7°, the power of the laser must be about 1.79 watts, if an opaque disk 28 (FIG. 2) is not provided (that is, the diameter of the opaque disk is 0.0 mm). Providing an opaque disk within the opening, however, having a diameter of about 0.009 mm, requires that the laser power be only about 1.65 watts to obtain the same 7° nozzle passageway wall angle "θ". Stated another way, for a given laser power, the nozzle passageway wall angle "θ" can be reduced by increasing the diameter of the opaque disk.

Figure 13:
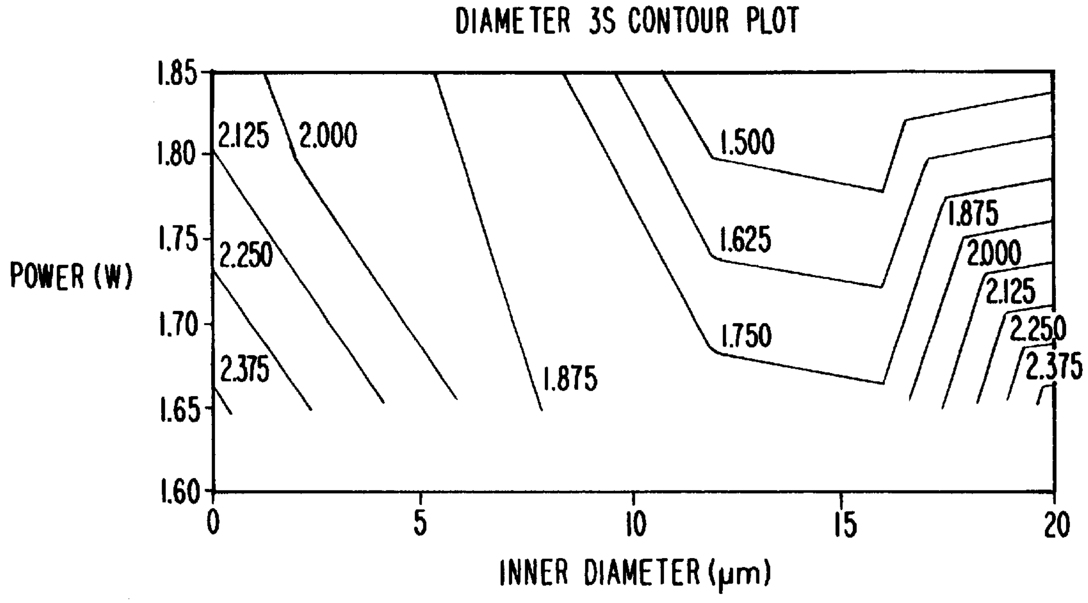

With reference now to FIG. 13, another feature of the present invention is shown to reduce the variation in paper side surface diameter "$d_1$" (FIG. 8) of the nozzle 40 due to minor fluctuations in laser power or intensity. For example, for a given laser power of about 1.85 watts, it has been observed that diameter "$d_1$" varies (using 3 times standard deviation) about ±0.002 mm if no opaque disk is formed within openings of mask. However, for the same laser power of 1.85 watts, variation in diameter "$d_1$" is reduced to about ±0.0015 mm if an opaque disk is provided having a diameter of about 0.011 mm.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Accordingly, modifications are contemplated which can be made without departing from either the spirit or the scope of the present invention.

We claim:

1. A method of forming one or more nozzles in a polymeric material substrate, comprising the steps of:

providing a laser source adapted to emit a beam of laser energy along a path directed substantially towards said substrate;

providing a mask having one or more openings surrounding one or more opaque mask portions;

positioning said mask between said laser source and said substrate such that said one or more openings of said mask intersect said path of said beam;

emitting said beam substantially along said path towards said substrate;

blocking one or more first portions of said beam with said mask such that one or more second portions of said beam pass through said one or more openings of said mask, said one or more second portions of said beam contacting one or more regions of said substrate such that one or more openings surrounding one or more polymeric material plug portions are formed in said substrate; and, removing said one or more plug portions from said substrate to form nozzles in said substrate.

2. The method of claim 1, wherein said removing step comprises the steps of:

providing a vacuum source; and, applying a vacuum via said vacuum source to said substrate to remove said one or more plug portions from said substrate.

3. The method of claim 1, wherein said step of providing a mask having one or more openings surrounding one or more opaque mask portions comprises the step of providing a mask having one or more frame-like openings.

4. The method of claim 3, wherein the step of providing a mask having one or more frame-like openings comprises the step of providing a mask having one or more annular openings.

5. The method of claim 3, wherein said step of providing a mask having one or more frame-like openings comprises the step of providing said one or more frame-like openings in said mask with a predetermined width such that said one or more openings in said substrate are formed with a preselected pitch.

6. The method of claim 1, wherein the step of providing a mask having one or more openings surrounding one or more opaque mask portions comprises the step of providing a mask having two or more openings surrounding a first opaque mask portion and two or more openings surrounding a second opaque mask portion.

7. The method of claim 1, wherein said step of providing a mask having one or more openings surrounding one or more opaque mask portions comprises the step of providing a mask having first and second adjacent openings surrounding first and second opaque mask portions, and wherein a center axis of said first opening is spaced from a center axis of said second opening by a distance of between about 0.017 mm and about 0.032 mm.

8. The method of claim 1, wherein said step of providing a mask having one or more openings surrounding one or more opaque mask portions comprises the step of providing a mask having at least one opening with a width on a first side of said substrate that is substantially less than a thickness of said substrate.

9. The method of claim 8, wherein a ratio of said width of said opening to said thickness of said substrate is between about 0.17 and about 0.25.

10. A system for forming one or more openings surrounding one or more plug portions in a polymeric material substrate, comprising:

a laser source adapted to emit a beam of laser energy along a path directed substantially towards said substrate; and, a mask having one or more openings surrounding one or more opaque mask portions, at least one of said one or more openings having a width that is substantially less than a thickness of said substrate, said mask being positioned between said laser source and said substrate, and wherein one or more portions of said beam pass through said one or more openings of said mask to contact one or more regions of said substrate such that said one or more openings surrounding said one or more polymeric material plug portions are formed in said substrate.

11. The system of claim 10, wherein said mask includes two or more openings surrounding a first opaque mask portion and two or more openings surrounding a second opaque mask portion.

12. The system of claim 10, wherein said mask includes first and second adjacent openings surrounding first and second opaque mask portions, and wherein a center axis of said first opening is spaced from a center axis of said second opening by a distance of between about 0.017 mm and about 0.032 mm.

13. The system of claim 10, wherein a ratio of said width of said opening to said thickness of said substrate is between about 0.17 and about 0.25.

14. The system of claim 10, wherein said mask comprises a first clear layer and a second opaque layer including said one or more openings surrounding said one or more mask portions.

15. The system of claim 14, wherein said one or more openings comprise one or more ring-shaped openings, each of which surrounds one of said opaque mask portions.

16. A method of forming one or more nozzles in a polymeric material substrate, comprising the steps of:

providing a polymeric material substrate;

laser ablating said substrate to form one or more openings surrounding one or more polymeric material plug portions in said substrate; and, removing said one or more plug portions such that one or more nozzles are provided in said substrate.

17. A method of claim 16, wherein said laser ablating step comprises the steps of:

providing a laser source adapted to emit a beam of laser energy along a path directed substantially towards said substrate;

providing a mask having one or more openings surrounding one or more opaque mask portions;

positioning said mask between said laser source and said substrate such that said one or more openings of said mask intersect said path of said beam;

emitting said beam substantially along said path towards said substrate; and, blocking one or more first portions of said beam with said mask such that one or more second portions of said beam pass through said one or more openings of said mask, said one or more second portions of said beam contacting one or more regions of said substrate such that one or more openings surrounding one or more plug portions are formed in said substrate.

18. An inkjet printhead nozzle plate, comprising a polymeric material substrate having a predetermined thickness of between about 25 mm and about 50 mm, wherein said substrate includes one or more openings therein arranged as a matrix, wherein said one or more openings includes a first opening and a second opening adjacent said first opening, wherein a center axis of said first opening is spaced from a center axis of said second opening by a distance of about 0.042 mm, and wherein each opening of said one or more openings defines a nozzle having a tapered wall forming an angle with a center axis of said opening of between about 5° and about 7°.

* * * * *

UNITED STATES PATENT AND TRADEMARK OFFICE
CERTIFICATE OF CORRECTION

PATENT NO. : 6,409,308 B1
DATED : June 25, 2002
INVENTOR(S) : Colin Geoffrey Maher and Kent Lee Ubellacker It is certified that error appears in the above-identified patent and that said Letters Patent is hereby corrected as shown below:

Title page,
Item [57], ABSTRACT,
Line 3, "ablation," should read -- ablation. --.

Column 1,
Line 61, "is to impart" should read -- is typical to impart --.

Column 2,
Line 41, "Its periphery" should read -- its periphery --.
Line 54, "Is optimized" should read -- is optimized --.

Column 4,
Line 15, "out In the" should read -- out in the --.
Line 46, "has n" should read -- has been --.
Line 52, "mask In" should read -- mask in --.

Column 5,
Line 41, "It Is" should read -- It is --.

Column 6,
Line 9, "to be a" should read -- to be of a --.
Line 26, "portion 33'" should read -- portion 32' --.

UNITED STATES PATENT AND TRADEMARK OFFICE

CERTIFICATE OF CORRECTION

PATENT NO. : 6,409,308 B1
DATED : June 25, 2002
INVENTOR(S) : Colin Geoffrey Maher and Kent Lee Ubellacker It is certified that error appears in the above-identified patent and that said Letters Patent is hereby corrected as shown below:

Column 7,
Line 50, “invention Is” should read -- invention is --.

Column 8,
Line 6, “of mask” should read -- of the mask --.

Signed and Sealed this

Eleventh Day of February, 2003

JAMES E. ROGAN
*Director of the United States Patent and Trademark Office*